July 21, 1925.  1,546,701
W. C. BAILER
ARTIFICIAL BAIT
Filed April 21, 1923
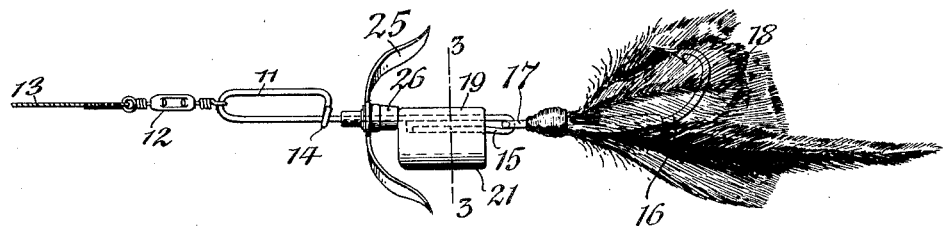
Fig.1.
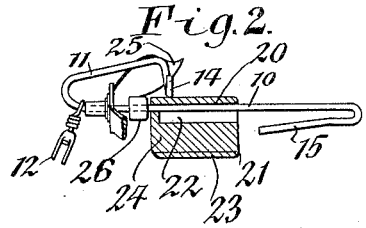
Fig.2.
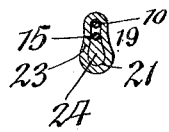
Fig.3.
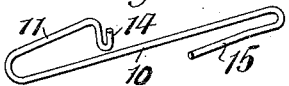
Fig.4.
Fig.5.
Inventor
William C. Bailer
by Theodore L. Popp
Attorney Patented July 21, 1925.

1,546,701

UNITED STATES PATENT OFFICE.

WILLIAM C. BAILER, OF BUFFALO, NEW YORK.

ARTIFICIAL BAIT.

Application filed April 21, 1923. Serial No. 633,592.

*To all whom it may concern:*

Be it known that I, WILLIAM C. BAILER, a citizen of the United States, residing at Buffalo, in the county of Erie and State of New York, have invented new and useful Improvements in Artificial Bait, of which the following is a specification.

This invention relates to an artificial bait which is more particularly designed for use in catching fish by casting the bait but which may also be used for trolling and other methods of fishing.

In fishing with artificial bait, it is frequently desirable to use hooks with different kinds of lures to suit the weather, the character of the fishing waters, and other conditions, so that at times it is desirable to select a bait which is most satisfactory for the occasion, such as feathered or buck tail hooks, bare hooks, or pork rind minnows. It has also been found from practical experience that a hook which rides upright and has its beak or point uppermost is more effective in catching fish when the latter strikes the lure, and that a hook riding in this manner will not become caught in weeds or snagged against matter in the water.

It is the object of this invention to provide an artificial bait of this character which not only permits of perfectly casting the lure, but also is so weighted that the lure rides the water in an upright position most favorable for catching a fish striking the same and also rendering the same weedless and snag proof, and which has means performing the double function of a righting weight and also as a lock for the lure, so that the same can be readily interchanged for another kind without the use of any tools.

In the accompanying drawings: Figure 1 is a side elevation of my improved artificial bait. Figure 2 is a longitudinal sectional elevation of the mounting for the lure, showing the same opened and in position to change one lure for another. Figure 3 is a vertical section taken on line 3—3, Fig. 1. Figure 4 is a perspective view of the main rod of the bait and the means for connecting the same with the line and the lure. Figure 5 is a similar view of the locking weight forming part of the bait.

Similar characters of reference indicate corresponding parts throughout the several views.

The main support or body of the bait consists of a longitudinal rod 10 the front end of which is provided with a reversely bent shank or arm 11 forming a front loop which is connected by a swivel 12 with the line 13. The rear end of the shank 11 is detachably connected with the main rod by a catch 14 whereby the swivel is confined on the front loop and permits of readily removing the particular tackle from the line and replacing the same with another when this is desired.

At its rear end the main rod is provided with another reversely bent shank or arm 15 which forms a rear loop and which is preferably arranged on the underside of the main rod, for a purpose as will presently appear.

With this rear loop may be detachably connected a lure of any suitable character, for example, a fish hook 16 having the eye 17 at its front end engaged with the rear loop, so that the point or beak of this hook is uppermost. This hook may either be bare or the same may be concealed more or less by means of feathers 18 attached to the hook or by means of hairs taken from the tail of a buck.

Righting and locking means are provided for normally retaining the fish hook in the position in which its point is uppermost and also serving to close the front end of the rear loop and lock the shank thereof to the adjacent part of the rod, thereby preventing the lure from becoming accidentally detached from the main rod. In its preferred form, these righting and locking means are constructed in the form of a weight body 19 provided in its upper part with a longitudinal opening 20 for the reception of the main rod and which has a depending extension 21 arranged on the underside of the main rod. Below its upper opening the pendant portion 21 of the weight body is provided with a locking recess 22 extending to the rear end thereof and adapted to receive the front end of the rear shank 15. When the weight is moved forwardly so as to disengage the front end of the rear shank from the locking recess of the weight, as shown in Fig. 2, it is possible to readily remove a lure from this loop and replace the same by another according to the particular waters, the kind of fish available and other conditions present. After the lure has been applied to the rear loop the weight is slipped rearwardly so that the front end of the rear loop shank enters the locking recess, whereby the hook is held against displacement and retained in a position in which its point is uppermost by reason of the pendant extension. When drawing the hook through the water in this position, a fish striking the same is most likely to be caught but the hook itself is not likely to get in the weeds or become snagged and instead will slide over these obstructions.

The righting and locking weight is preferably constructed of a shell 23 of sheet metal and a core 24 of soft metal poured into the shell, but the same may obviously be made otherwise.

In addition to the weight other elements may be mounted on the main rod such for instance as a cut-water spinner 25 which turns on the rod immediately in rear of the front loop, and a spacing bead or sleeve 26 arranged on the rod between the spinner and the weight. This sleeve and spinner preferably take up most of the space between the weight and the front loop, so that when the latter is caught on the rod, as shown in Fig. 1, the weight cannot be moved forwardly to unlock the rear loop. To do this, it is first necessary to detach the loop from the rod, then push the spinner and sleeve forwardly on the rod and into the front loop, and then move the weight forwardly sufficiently to unlock the rear loop, as shown in Fig. 2. Reassembling of the parts after changing the lure is effected in the reverse order just described.

This operation of opening and closing the tackle for the purpose of substituting one lure for another, can be effected without the use of any tools, thereby rendering the same very convenient in use. Furthermore, the weight aside from serving as a lock and as a keel to keep the hook upright, also simplifies the structure as a whole and reduces the cost of manufacture. Moreover, the reduction in the number of parts renders the tackle less liable to get out of order and also improves its qualities as a casting bait inasmuch as the parts are not liable to become deranged and interfere with the operation of the tackle.

I claim as my invention:

An artificial fishing bait comprising a longitudinal rod provided at its rear end with a reversely bent shank forming a loop which is adapted to receive a lure, and a weight slidable lengthwise on said rod and having a recess adapted to receive the front end of said shank for closing the loop and also provide with a downwardly extending keel which serves to keep the weight and the lure attached to the loop in an upright position, said keel being arranged below the axis of the points of attachment of said rod to the fishing line and the lure.

WILLIAM C. BAILER.